United States Patent
Zarringhalam et al.

(10) Patent No.: US 12,330,642 B2
(45) Date of Patent: Jun. 17, 2025

(54) VEHICLE SYSTEMS AND AUTONOMOUS LANE DEPARTURE MITIGATION METHODS

(71) Applicant: GM GLOBAL TECHNOLOGY OPERATIONS LLC, Detroit, MI (US)

(72) Inventors: Reza Zarringhalam, Whitby (CA); Jimmy Lu, Stouffville (CA); Jackson Barry McGrory, Mississauga (CA); Mohammed Raju Hossain, Scarborough (CA); Kin Man Michael Wong, Thornhill (CA); Amirreza Mirbeygi Moghaddam, Toronto (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 193 days.

(21) Appl. No.: 18/353,051

(22) Filed: Jul. 14, 2023

(65) Prior Publication Data

US 2025/0018940 A1 Jan. 16, 2025

(51) Int. Cl.
*B60W 30/12* (2020.01)
*B60W 30/095* (2012.01)
*B60W 60/00* (2020.01)
*B62D 15/02* (2006.01)

(52) U.S. Cl.
CPC ........ *B60W 30/12* (2013.01); *B60W 30/0953* (2013.01); *B60W 60/0013* (2020.02); *B60W 60/0016* (2020.02); *B62D 15/025* (2013.01); *B60W 2540/18* (2013.01)

(58) Field of Classification Search
CPC ........... B60W 30/095; B60W 30/0953; B60W 30/12; B60W 30/16; B60W 30/162; B60W 30/165; B60W 30/17; B60W 60/001; B60W 60/0013; B60W 60/0015; B60W 60/0016; B60W 2540/18; B60K 28/00–165; B62D 15/025; G05D 1/0061; G05D 1/0088;
(Continued)

(56) References Cited

U.S. PATENT DOCUMENTS 9,278,713 B2 * 3/2016 Moshchuk ......... B62D 15/0265
2020/0341476 A1 * 10/2020 Wuthishuwong ...... G08G 1/167
2022/0126824 A1 4/2022 Kato

FOREIGN PATENT DOCUMENTS

DE 102021202740 A1 9/2022

* cited by examiner

*Primary Examiner* — Mark L. Greene
(74) *Attorney, Agent, or Firm* — Lorenz & Kopf LLP

(57) ABSTRACT

Vehicles and related systems and methods are provided for mitigating lane departures, alternatively referred to as lane keeping assistance. One method of assisting vehicle operation involves determining a control trajectory for the vehicle over a prediction horizon that satisfies one or more steering angle constraints for operating a steering system of the vehicle based at least in part on a current steering angle, a first difference between the control trajectory and a reference lateral trajectory for the vehicle and a second difference between the control trajectory and a lane boundary, for example, by minimizing a weighted sum of the differences. The method continues by determining a steering angle command for the vehicle based at least in part on the control trajectory and autonomously operating one or more actuators onboard the vehicle in accordance with the steering angle command prior to the vehicle crossing the lane boundary.

20 Claims, 4 Drawing Sheets

(58) Field of Classification Search
CPC .... G05D 1/021; G05D 1/0214; G05D 1/0221; G05D 1/0223
See application file for complete search history.

VEHICLE SYSTEMS AND AUTONOMOUS LANE DEPARTURE MITIGATION METHODS

INTRODUCTION

The technical field generally relates to vehicle systems and more particularly relates to autonomous driver assistance to maintain operation of the vehicle within a desired lane of travel.

Modern vehicles include various enhanced or advanced features to support a human driver operating a vehicle. Many vehicles are capable of sensing their environment and facilitating vehicle operation. For example, an autonomous vehicle or other vehicle capable of supporting autonomous operating modes senses its environment using sensing devices such as radar, lidar, image sensors, and the like. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Automated driver assistance technologies hold the potential to improve safety and user experience. Lane keeping assistance is an autonomous driver assistance feature that helps prevent a vehicle from unintentionally drifting out of its lane by returning the vehicle to its intended lane of travel. However, some drivers or passengers may perceive intervention by autonomous driver assistance features to be abrupt, nonintuitive or otherwise disruptive to the driving experience. For example, a lane keeping assistance feature may engage later than expected and allow a lane departure, engage more aggressively than expected, or engage in a manner that can potentially disrupt, interfere with or conflict with the driver's concurrent manual control of the steering wheel. Accordingly, it is desirable to provide driver assistance functionality with more seamless engagement and intuitive behavior.

SUMMARY

Apparatus for a vehicle and related methods and vehicle systems are provided. One method of assisting operation of a vehicle involves obtaining, by a controller associated with the vehicle, a reference lateral trajectory for the vehicle, obtaining, by the controller, a current steering angle associated with the vehicle, determining, by the controller, a control trajectory for the vehicle over a prediction horizon that satisfies one or more steering angle constraints for operating the vehicle based at least in part on the current steering angle, a first difference between the control trajectory and the reference lateral trajectory and a second difference between the control trajectory and a lane boundary, determining, by the controller, a steering angle command for the vehicle based at least in part on the control trajectory, and autonomously operating, by the controller, one or more actuators onboard the vehicle in accordance with the steering angle command prior to the vehicle crossing the lane boundary.

In one or more implementations, determining the control trajectory involves determining a sequence of future steering angle commands for the vehicle based at least in part on the current steering angle and the one or more steering angle constraints, and determining a sequence of predicted lateral positions for the vehicle over the prediction horizon based at least in part on the sequence of future steering angle commands, wherein the control trajectory includes the sequence of predicted lateral positions. In an implementation, determining the sequence of future steering angle commands involves iteratively adjusting one or more of the future steering angle commands to minimize the first difference between the control trajectory and the reference lateral trajectory. In another implementation, determining the sequence of future steering angle commands involves iteratively adjusting one or more of the future steering angle commands to minimize the second difference between the control trajectory and the lane boundary. In another implementation, determining the sequence of future steering angle commands involves iteratively adjusting one or more of the future steering angle commands to minimize a weighted sum of the first difference between the control trajectory and the reference lateral trajectory and the second difference between the control trajectory and the lane boundary. In another implementation, determining the sequence of future steering angle commands involves iteratively adjusting one or more of the future steering angle commands to minimize a third difference between successive future steering angle commands of the sequence of future steering angle commands. In another implementation, determining the sequence of future steering angle commands involves iteratively adjusting one or more of the future steering angle commands to minimize a third difference between an initial future steering angle command of the sequence of future steering angle commands and a driver steering angle commanded by a driver of the vehicle.

In one or more implementations, obtaining the reference lateral trajectory involves receiving the reference lateral trajectory for returning the vehicle to a center of a lane in accordance with lane keeping assistance functionality of a guidance system associated with the vehicle. In one or more implementations, autonomously operating the one or more actuators involves autonomously operating the one or more actuators onboard the vehicle in accordance with the steering angle command when a future steering angle command of a sequence of future steering angle commands associated with the control trajectory satisfies an engagement threshold. In one implementation, autonomously operating the one or more actuators involves autonomously operating the one or more actuators onboard the vehicle in accordance with the steering angle command when a difference between the future steering angle command and the current steering angle for the vehicle is greater than a first threshold or when a rate of change associated with the future steering angle command is greater than a second threshold.

An apparatus for a non-transitory computer-readable medium is provided. The non-transitory computer-readable medium has stored or encoded thereon executable instructions that, when executed by a processor, cause the processor to provide a model predictive control system configurable to obtain a reference lateral trajectory for a vehicle, obtain a current steering angle associated with the vehicle, determine a control trajectory for the vehicle over a prediction horizon that satisfies one or more steering angle constraints for operating the vehicle based at least in part on the current steering angle, a first difference between the control trajectory and the reference lateral trajectory and a second difference between the control trajectory and a lane boundary, determine a steering angle command for the vehicle based at least in part on the control trajectory, and autonomously operate one or more actuators onboard the vehicle in accordance with the steering angle command prior to the vehicle crossing the lane boundary.

In one or more implementations, the model predictive control system is configurable to determine a sequence of future steering angle commands for the vehicle based at least in part on the current steering angle and the one or more steering angle constraints and determine a sequence of predicted lateral positions for the vehicle over the prediction horizon based at least in part on the sequence of future steering angle commands, wherein the control trajectory includes the sequence of predicted lateral positions. In one or more implementations, the model predictive control system is configurable to iteratively adjust one or more of the future steering angle commands to minimize the first difference between the control trajectory and the reference lateral trajectory. In one or more implementations, the model predictive control system is configurable to iteratively adjust one or more of the future steering angle commands to minimize the second difference between the control trajectory and the lane boundary. In one or more implementations, the model predictive control system is configurable to iteratively adjust one or more of the future steering angle commands to minimize a weighted sum of the first difference between the control trajectory and the reference lateral trajectory and the second difference between the control trajectory and the lane boundary. In one or more implementations, the model predictive control system is configurable to iteratively adjust one or more of the future steering angle commands to minimize a third difference between successive future steering angle commands of the sequence of future steering angle commands. In one or more implementations, the model predictive control system is configurable to iteratively adjust one or more of the future steering angle commands to minimize a third difference between an initial future steering angle command of the sequence of future steering angle commands and a driver steering angle commanded by a driver of the vehicle. In one or more implementations, the reference lateral trajectory returns the vehicle to a center of a lane in accordance with lane keeping assistance functionality of a guidance system associated with the vehicle.

An exemplary vehicle is also provided that includes a steering system, one or more actuators associated with the steering system, and a controller coupled to the one or more actuators that, by a processor, is configurable to obtain a reference lateral trajectory for the vehicle, obtain a current steering angle associated with the steering system of the vehicle, identify a lane boundary for a current lane of travel for the vehicle, determine a control trajectory for the vehicle over a prediction horizon that satisfies one or more steering angle constraints for operating the steering system based at least in part on the current steering angle, a first difference between the control trajectory and the reference lateral trajectory and a second difference between the control trajectory and the lane boundary, determine a steering angle command for the one or more actuators based at least in part on the control trajectory, and autonomously operate the one or more actuators onboard the vehicle in accordance with the steering angle command to control a subsequent steering angle associated with the steering system prior to the vehicle crossing the lane boundary. In one or more implementations, the controller is configurable to provide a model predictive control system to determine a sequence of future steering angle commands for the vehicle based at least in part on the current steering angle and the one or more steering angle constraints and determine a sequence of predicted lateral positions for the vehicle over the prediction horizon based at least in part on the sequence of future steering angle commands, wherein the control trajectory includes the sequence of predicted lateral positions and the model predictive control system is configurable to iteratively adjust one or more of the future steering angle commands to minimize at least one of the first difference between the control trajectory and the reference lateral trajectory and the second difference between the control trajectory and the lane boundary.

BRIEF DESCRIPTION OF THE DRAWINGS

The exemplary aspects will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
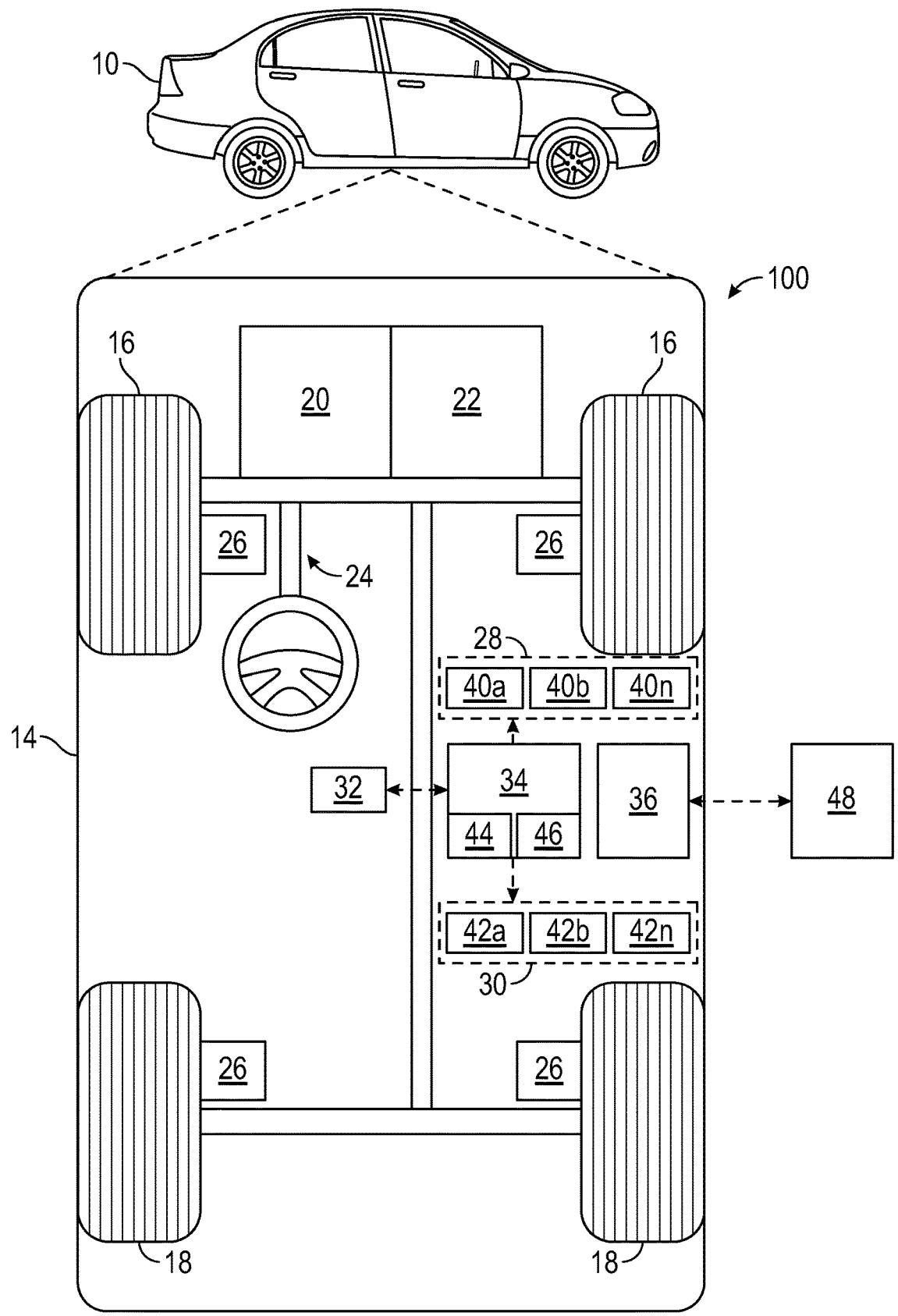
FIG. 1 is a block diagram illustrating a vehicle system in accordance with various implementations.

FIG. 1 depicts an exemplary implementation of a vehicle system 100 suitable for providing one or more driver assistance features or functionality that supports autonomous operation of a vehicle 10. In this regard, in some implementations, the vehicle system 100 is capable of determining a plan for autonomously operating a vehicle 10 along a route in a manner that accounts for objects or obstacles detected by onboard sensors 28, 40. As depicted in FIG. 1, the vehicle 10 generally includes a chassis, a body 14, and front and rear wheels 16, 18 rotationally coupled to the chassis near a respective corner of the body 14. The body 14 is arranged on the chassis and substantially encloses components of the vehicle 10, and the body 14 and the chassis may jointly form a frame.

In exemplary implementations, the vehicle 10 is an autonomous vehicle or is otherwise configured to support one or more autonomous operating modes, and the control system 100 is incorporated into the vehicle 10 (hereinafter referred to as the vehicle 10). The vehicle 10 is depicted in the illustrated implementation as a passenger car, but it should be appreciated that any other vehicle including motorcycles, trucks, sport utility vehicles (SUVs), recreational vehicles (RVs), marine vessels, aircraft, etc., can also be used. In an exemplary implementation, the vehicle 10 is a so-called Level Two automation system. A Level Two system indicates "partial driving automation," referring to the driving mode-specific performance by an automated driving system to control steering, acceleration and braking in specific scenarios while a driver remains alert and actively supervises the automated driving system at all times and is capable of providing driver support to control primary driving tasks. For example, the vehicle system 100 may support a lane keep assist (LKA) autonomous operating mode or other lane keeping assistance functionality that autonomously controls steering to facilitate maintaining the vehicle 10 in a desired lane of travel by minimizing or otherwise mitigating lane departure.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various implementations, include an internal combustion engine, an electric machine such as a traction motor, and/or a fuel cell propulsion system. The transmission system 22 is configured to transmit power from the propulsion system 20 to the vehicle wheels 16, 18 according to selectable speed ratios. According to various implementations, the transmission system 22 may include a step-ratio automatic transmission, a continuously-variable transmission, or other appropriate transmission. The brake system 26 is configured to provide braking torque to the vehicle wheels 16, 18. The brake system 26 may, in various implementations, include friction brakes, brake by wire, a regenerative braking system such as an electric machine, and/or other appropriate braking systems. The steering system 24 influences a position of the of the vehicle wheels 16, 18. While depicted as including a steering wheel for illustrative purposes, in some implementations contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various implementations, the vehicle features can further include interior and/or exterior vehicle features such as, but are not limited to, doors, a trunk, and cabin features such as air, music, lighting, etc. (not numbered).

The data storage device 32 stores data for use in automatically controlling the vehicle 10. In various implementations, the data storage device 32 stores defined maps of the navigable environment. In various implementations, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, implementations of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various implementations, one or more instructions of the controller 34 are embodied in the control system 100 (e.g., in data storage element 46) and, when executed by the processor 44, cause the processor 44 to obtain data captured or generated from imaging and ranging devices 40 and utilize the captured environmental data to determine commands for autonomously operating the vehicle 10, as described in greater detail below. In one or more exemplary implementations, the data storage element 46 maintains information that may be utilized to determine corresponding a lateral reference trajectory for maneuvering laterally, with the resulting reference lateral trajectory being utilized or otherwise referenced by the processor 44 to determine steering commands for autonomously operating the vehicle 10 to mitigate lateral deviations from the desired lane of travel.

Still referring to FIG. 1, in exemplary implementations, the communication system 36 is configured to wirelessly communicate information to and from other entities 48 over a communication network, such as but not limited to, other vehicles ("V2V" communication) infrastructure ("V2I" communication), remote systems, and/or personal devices. In an exemplary implementation, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The communication network utilized by the communication system 36 can include a wireless carrier system such as a cellular telephone system that includes a plurality of cell towers (not shown), one or more mobile switching centers (MSCs) (not shown), as well as any other networking components required to connect the wireless carrier system with a land communications system, and the wireless carrier system can implement any suitable communications technology, including for example, digital technologies such as CDMA (e.g., CDMA2000), LTE (e.g., 4G LTE or 5G LTE), GSM/GPRS, or other current or emerging wireless technologies. Additionally, or alternatively, a second wireless carrier system in the form of a satellite communication system can be utilized to provide uni-directional or bi-directional communication using one or more communication satellites (not shown) and an uplink transmitting station (not shown), including, but not limited to satellite radio services, satellite telephony services and/or the like. Some implementations may utilize a land communication system, such as a conventional land-based telecommunications network including a public switched telephone network (PSTN) used to provide hardwired telephony, packet-switched data communications, and the Internet infrastructure. One or more segments of a land communication system can be implemented using a standard wired network, a fiber or other optical network, a cable network, power lines, other wireless networks such as wireless local area networks (WLANs), or networks providing broadband wireless access (BWA), or any combination thereof.

Figure 2:
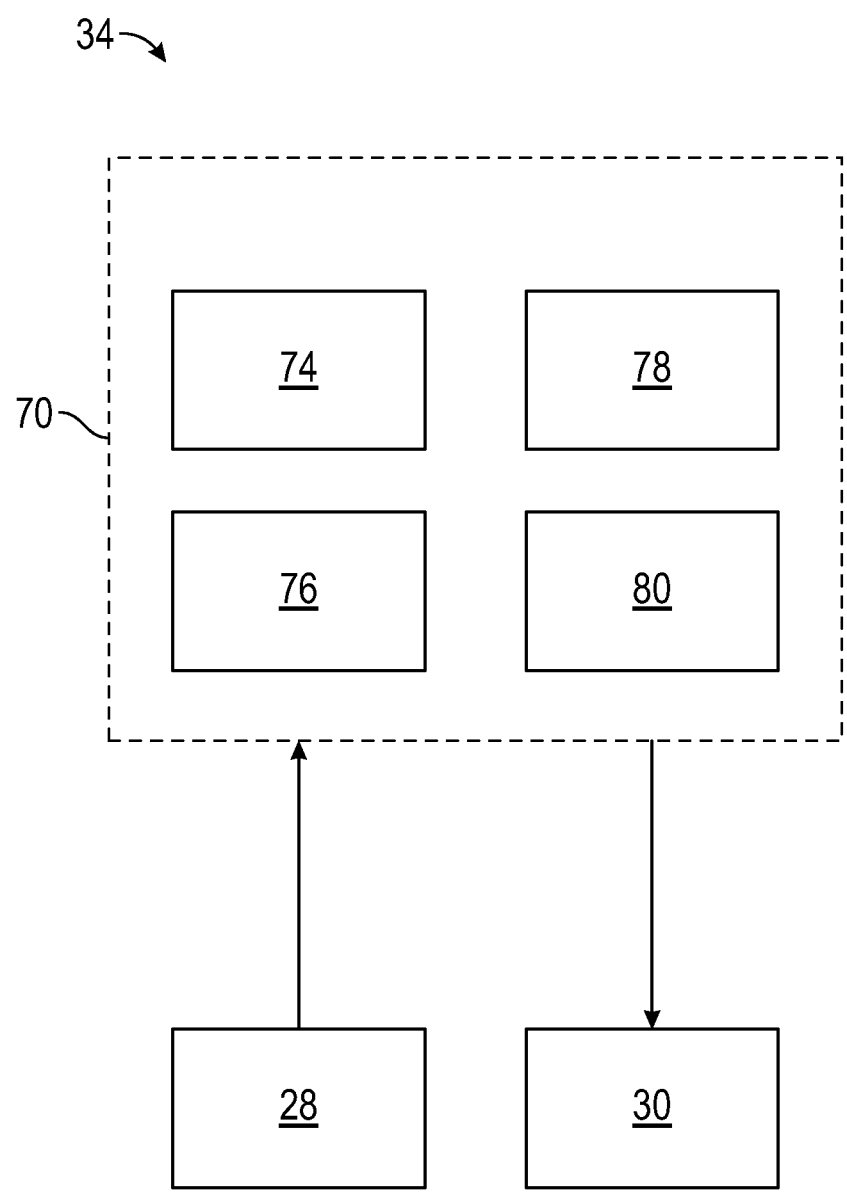
FIG. 2 is a block diagram illustrating an autonomous driving system (ADS) suitable for use with the vehicle system of FIG. 1 in accordance with various implementations.

Referring now to FIG. 2, in accordance with various implementations, controller 34 implements an autonomous driving system (ADS) 70. That is, suitable software and/or hardware components of controller 34 (e.g., processor 44 and computer-readable storage device 46) are utilized to provide an autonomous driving system 70 that is used in conjunction with vehicle 10, for example, to automatically control various actuators 30 and thereby control vehicle acceleration, steering, and braking, respectively, without human intervention.

In various implementations, the instructions of the autonomous driving system 70 may be organized by function or system. For example, as shown in FIG. 2, the autonomous driving system 70 can include a sensor fusion system 74, a positioning system 76, a guidance system 78, and a vehicle control system 80. As can be appreciated, in various implementations, the instructions may be organized into any number of systems (e.g., combined, further partitioned, etc.) as the disclosure is not limited to the present examples.

In various implementations, the sensor fusion system 74 synthesizes and processes sensor data and predicts the presence, location, classification, and/or path of objects and features of the environment of the vehicle 10. In various implementations, the sensor fusion system 74 can incorporate information from multiple sensors, including but not limited to cameras, lidars, radars, and/or any number of other types of sensors. In one or more exemplary implementations described herein, the sensor fusion system 74 correlates image data to lidar point cloud data, the vehicle reference frame, or some other reference coordinate frame using calibrated conversion parameter values associated with the pairing of the respective camera and reference frame to relate lidar points to pixel locations, assign depths to the image data, identify objects in one or more of the image data and the lidar data, or otherwise synthesize associated image data and lidar data. In other words, the sensor output from the sensor fusion system 74 provided to the vehicle control system 80 (e.g., indicia of detected objects and/or their locations relative to the vehicle 10) reflects or is otherwise influenced by the calibrations and associations between camera images, lidar point cloud data, and the like.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow given the current sensor data and current vehicle pose. The vehicle control system 80 then generates control signals for controlling the vehicle 10 according to the determined path. In various implementations, the controller 34 implements machine learning techniques to assist the functionality of the controller 34, such as feature detection/classification, obstruction mitigation, route traversal, mapping, sensor integration, ground-truth determination, and the like.

In one or more implementations, the guidance system 78 includes a motion planning module that generates a motion plan for controlling the vehicle as it traverses along a route. The motion planning module includes a longitudinal solver module that generates a longitudinal motion plan output for controlling the movement of the vehicle along the route in the general direction of travel, for example, by causing the vehicle to accelerate or decelerate at one or more locations in the future along the route to maintain a desired speed or velocity. The motion planning module also includes a lateral solver module that generates a lateral motion plan output for controlling the lateral movement of the vehicle along the route to alter the general direction of travel, for example, by steering the vehicle at one or more locations in the future along the route (e.g., to maintain the vehicle centered within a lane, change lanes, etc.). The longitudinal and lateral plan outputs correspond to the commanded (or planned) path output provided to the vehicle control system 80 for controlling the vehicle actuators 30 to achieve movement of the vehicle 10 along the route that corresponds to the longitudinal and lateral plans.

During normal operation, the longitudinal solver module attempts to optimize the vehicle speed (or velocity) in the direction of travel, the vehicle acceleration in the direction of travel, and the derivative of the vehicle acceleration in the direction of travel, alternatively referred to herein as the longitudinal jerk of the vehicle, and the lateral solver module attempts to optimize one or more of the steering angle, the rate of change of the steering angle, and the acceleration or second derivative of the steering angle, alternatively referred to herein as the lateral jerk of the vehicle. In this regard, the steering angle can be related to the curvature of the path or route, and any one of the steering angle, the rate of change of the steering angle, and the acceleration or second derivative of the steering angle can be optimized by the lateral solver module, either individually or in combination.

In an exemplary implementation, the longitudinal solver module receives or otherwise obtains the current or instantaneous pose of the vehicle, which includes the current position or location of the vehicle, the current orientation of the vehicle, the current speed or velocity of the vehicle, and the current acceleration of the vehicle. Using the current position or location of the vehicle, the longitudinal solver module also retrieves or otherwise obtains route information which includes information about the route the vehicle is traveling along given the current pose and plus some additional buffer distance or time period (e.g., 12 seconds into the future), such as, for example, the current and future road grade or pitch, the current and future road curvature, current and future lane information (e.g., lane types, boundaries, and other constraints or restrictions), as well as other constraints or restrictions associated with the roadway (e.g., minimum and maximum speed limits, height or weight restrictions, and the like). The route information may be obtained from, for example, an onboard data storage element 32, an online database, or other entity. In one or more implementations, the lateral route information may include the planned lateral path command output by the lateral solver module, where the longitudinal and lateral solver modules iteratively derive an optimal travel plan along the route.

The longitudinal solver module also receives or otherwise obtains the current obstacle data relevant to the route and current pose of the vehicle, which may include, for example, the location or position, size, orientation or heading, speed, acceleration, and other characteristics of objects or obstacles in a vicinity of the vehicle or the future route. The longitudinal solver module also receives or otherwise obtains longitudinal vehicle constraint data which characterizes or otherwise defines the kinematic or physical capabilities of the vehicle for longitudinal movement, such as, for example, the maximum acceleration and the maximum longitudinal jerk, the maximum deceleration, and the like. The longitudinal vehicle constraint data may be specific to each particular vehicle and may be obtained from an onboard data storage element 32 or from a networked database or other entity 48, 52, 54. In some implementations, the longitudinal vehicle constraint data may be calculated or otherwise determined dynamically or substantially in real-time based on the current mass of the vehicle, the current amount of fuel onboard the vehicle, historical or recent performance of the vehicle, and/or potentially other factors. In one or more implementations, the longitudinal vehicle constraint data is calculated or determined in relation to the lateral path, the lateral vehicle constraint data, and/or determinations made by the lateral solver module. For example, the maximum longitudinal speed may be constrained at a particular location by the path curvature and the maximum lateral acceleration by calculating the maximum longitudinal speed as a function of the path curvature and the maximum lateral acceleration (which itself could be constrained by rider preferences or vehicle dynamics). In this regard, at locations where the degree of path curvature is relatively high (e.g., sharp turns), the maximum longitudinal speed may be limited accordingly to maintain comfortable or achievable lateral acceleration along the curve.

Using the various inputs to the longitudinal solver module, the longitudinal solver module calculates or otherwise determines a longitudinal plan (e.g., planned speed, acceleration and jerk values in the future as a function of time) for traveling along the route within some prediction horizon (e.g., 12 seconds) by optimizing some longitudinal cost variable or combination thereof (e.g., minimizing travel time, minimizing fuel consumption, minimizing jerk, or the like) by varying the speed or velocity of the vehicle from the current pose in a manner that ensures the vehicle complies with longitudinal ride preference information to the extent possible while also complying with lane boundaries or other route constraints and avoiding collisions with objects or obstacles. In this regard, in many conditions, the resulting longitudinal plan generated by the longitudinal solver module does not violate the maximum vehicle speed, the maximum vehicle acceleration, the maximum deceleration, and the maximum longitudinal jerk settings associated with the user, while also adhering to the following distances or buffers associated with the user. That said, in some scenarios, violating one or more longitudinal ride preference settings may be necessary to avoid collisions, comply with traffic signals, or the like, in which case, the longitudinal solver module may attempt to maintain compliance of as many of the user-specific longitudinal ride preference settings as possible. Thus, the resulting longitudinal plan generally complies with the user's longitudinal ride preference information but does not necessarily do so strictly.

In a similar manner, the lateral solver module receives or otherwise obtains the current vehicle pose and the relevant route information and obstacle data for determining a lateral travel plan solution within the prediction horizon. The lateral solver module also receives or otherwise obtains lateral vehicle constraint data which characterizes or otherwise defines the kinematic or physical capabilities of the vehicle for lateral movement, such as, for example, the maximum steering angle or range of steering angles, the minimum turning radius, the maximum rate of change for the steering angle, and the like. The lateral vehicle constraint data may also be specific to each particular vehicle and may be obtained from an onboard data storage element 32 or from a networked database or other entity 48, 52, 54. The lateral solver module may also receive or otherwise obtain user-specific lateral ride preference information which includes, for example, user-specific values or settings for the steering rate (e.g., a maximum rate of change for the steering angle, a maximum acceleration of the steering angle, and/or the like), the lateral jerk, and the like. The lateral ride preference information may also include user-specific distances or buffers, such as, for example, a minimum and/or maximum distance from lane boundaries, a minimum lateral buffer or lateral separation distance between objects or obstacles, and the like, and potentially other user-specific lane preferences (e.g., a preferred lane of travel).

Using the various inputs to the lateral solver module, the lateral solver module calculates or otherwise determines a lateral plan for traveling along the route at future locations within some prediction horizon (e.g., 50 meters) by optimizing some lateral cost variable or combination thereof (e.g., minimizing deviation from the center of the roadway, minimizing the curvature of the path, minimizing lateral jerk, or the like) by varying the steering angle or vehicle wheel angle in a manner that ensures the vehicle complies with the lateral ride preference information to the extent possible while also complying with lane boundaries or other route constraints and avoiding collisions with objects or obstacles.

During normal operation, the lateral solver module may utilize the longitudinal travel plan from the longitudinal solver module along with the route information and obstacle data to determine how to steer the vehicle from the current pose within the prediction horizon while attempting to comply with the lateral ride preference information. In this regard, the resulting longitudinal and lateral travel plans that are ultimately output by the motion planning module comply with as many of the user's ride preferences as possible while optimizing the cost variable and avoiding collisions by varying one or more of the vehicle's velocity, acceleration/ deceleration (longitudinally and/or laterally), jerk (longitudinally and/or laterally), steering angle, and steering angle rate of change. The longitudinal travel plan output by the motion planning module includes a sequence of planned velocity and acceleration commands with respect to time for operating the vehicle within the longitudinal prediction horizon (e.g., a velocity plan for the next 12 seconds), and similarly, the lateral travel plan output by the motion planning module includes a sequence of planned steering angles and steering rates with respect to distance or position for steering the vehicle within the lateral prediction horizon while operating in accordance with the longitudinal travel plan (e.g., a steering plan for the next 50 meters). The longitudinal and lateral plan outputs are provided to the vehicle control system 80, which may utilize vehicle localization information and employs its own control schemes to generate control outputs that regulate the vehicle localization information to the longitudinal and lateral plans by varying velocity and steering commands provided to the actuators 30, thereby varying the speed and steering of the vehicle 10 to emulate or otherwise effectuate the longitudinal and lateral plans.

Figure 3:
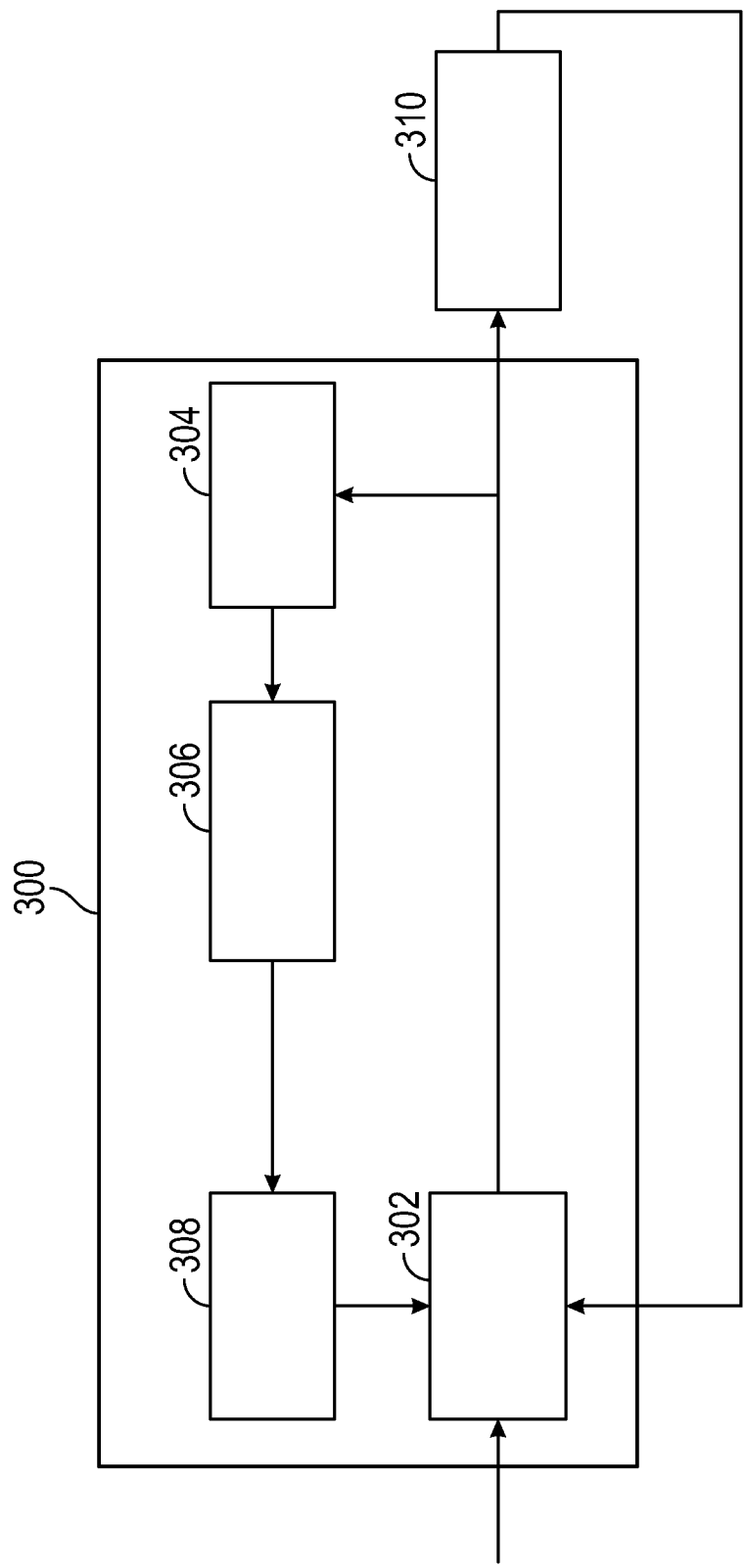
FIG. 3 is a block diagram illustrating a model predictive control (MPC) system suitable for implementation by a vehicle control system in the ADS of FIG. 2 according to one or more implementations described herein.

Referring now to FIG. 3 with continued reference to FIGS. 1-2, in exemplary implementations, the vehicle control system 80 includes or is otherwise configured to implement a model predictive control (MPC) system 300 that receives the planned reference trajectory information output by the guidance system 78 that resulted from the path planning logic associated with the guidance system 78. The MPC system 300 utilizes the planned reference trajectory information for the vehicle along with the current vehicle pose from the positioning system 76 and other current vehicle state information to determine corresponding actuation commands that are provided to an actuator control system 310 (e.g., actuator system 30) for operating one or more vehicle actuators (e.g., one or more actuator devices 42a-42n associated with the steering system 24) to attempt to achieve the desired reference trajectory while accounting for vehicle dynamics, lag or delay and potentially other real-world factors or conditions that may impact the ability of the vehicle to adhere to the planned reference trajectory without any lateral deviation.

In exemplary implementations, the MPC system 300 is configured to optimize the steering angle command to be provided to the particular vehicle actuator control system 310 over a prediction horizon to minimize the lateral deviation of the vehicle from the planned lateral reference trajectory and minimize the lane departure (or lane excursion) from the current lane of travel while also satisfying safety, comfort and/or other constraints that limit one or more of the steering angle, the rate of change of the steering angle, the acceleration or second derivative of the steering angle, the lateral velocity (or rate of change of the lateral position), the lateral acceleration, and/or the like. As a result of the optimization and explicit constraints applied by the MPC system 300, the MPC system 300 may preemptively engage or initiate steering angle commands or other steering adjustments to proactively regulate the lateral trajectory of the vehicle back to the lateral reference trajectory and/or the desired lane of travel prior to a lane departure to ensure compliance of the applicable constraints. Rather than delaying engagement until a point in time where a lane departure is imminent or has already occurred, the MPC system 300 preemptively engages and corrects the lateral trajectory of the vehicle, as described in greater detail below.

In exemplary implementations, the MPC system 300 is implemented by or at a control module associated with a vehicle, such as by or at the controller 34 as part of the vehicle control system 80 of the ADS 70. In this regard, the MPC system 300 generally represents the software or other components embodied by executable instructions maintained in a data storage element or other computer-readable medium that are configurable to support or otherwise perform one or more processes, logic, calculations, methods and/or algorithms associated with the subject matter described herein. The illustrated MPC system 300 includes a vehicle prediction model 302, an actuator prediction model 304, an actuation delay compensation prediction model 306 and an optimization model 308 that is cooperatively configured to facilitate iteratively adjusting or optimizing the outputs of the respective models 302, 304, 306 to arrive at an optimal steering angle command output by the MPC system 300 that minimizes a cost function associated with the MPC system 300 over a prediction horizon. For example, in one or more implementations, the MPC system 300 may be configurable to optimize or minimize the cost function over a prediction horizon of two seconds into the future using a discrete set of twenty different points occurring every ten milliseconds into the future from the point in time associated with the most recent update of the MPC system 300.

The vehicle prediction model 302 generally represents the process, service, software or other component of the MPC system 300 that is configurable to receive, as an input to the MPC system 300, path planning information from a guidance system 78 including, but not limited to, a reference lateral trajectory for the vehicle ($y_{ref}$) and a reference steering angle ($u_{ref}$) for the vehicle. In this regard, the reference lateral trajectory for the vehicle ($y_{ref}$) and the reference steering angle ($u_{ref}$) input to the MPC system 300 may be realized as a vector or matrix that includes a series or sequence of reference values that represent target values for the lateral position and steering angle of the vehicle over the prediction horizon associated with the guidance system 78 (e.g., over the next 12 seconds). The vehicle prediction model 302 also receives current vehicle state information from the positioning system 76 or another component of the vehicle, that includes, but is not limited to, the current lateral position, the current steering angle and the current heading of the vehicle. Based on the relationship between the current vehicle state information and the reference lateral trajectory and the reference steering angle over a period of time in the future, the vehicle prediction model 302 is configurable to utilize vehicle dynamics to solve one or more differential equations and arrive at a corresponding vector or matrix of target steering angle values that represent a series or sequence of commanded steering angles for achieving or approximating the reference lateral trajectory and the reference steering angles.

The actuator prediction model 304 generally represents the process, service, software or other component of the MPC system 300 that is configurable to receive the steering angle vector from the vehicle prediction model 302 and translate, convert or otherwise map the targeted steering angle values into a corresponding vector of achievable steering angle values that represent the steering angles that the vehicle actuation system is capable of achieving given the targeted steering angle vector. The probable steering angle vector is then input or otherwise provided to a delay compensation model 306 that generally represents the process, service, software or other component of the MPC system 300 that is configurable to translate, convert or otherwise map the achievable steering angle value into a corresponding vector of probable steering angle values that are likely to actually be realized or achieved by the vehicle actuation system accounting for communication delays and other delays associated with the actuation.

The optimization model 308 utilizes the probable steering angle vector to calculate or otherwise determine the predicted lateral position of the vehicle over a prediction horizon associated with the MPC system 300, determine a cost associated with the probable steering angle vector resulting from the current steering angle command vector, and iteratively adjusts one or more of the target steering angle values of the steering angle command vector to minimize or otherwise optimize the cost over the prediction horizon associated with the MPC system 300. In this regard, the predicted lateral position of the vehicle over the prediction horizon may be fed back into the vehicle prediction model 302 to iteratively adjust the target steering angle values based on the differences between respective pairs of values of the predicted lateral position vector for the vehicle and the reference lateral trajectory position vector provided by the guidance system 78. In exemplary implementations, the different models 302, 304, 306, 308 associated with the MPC system 300 are cooperatively configured to repeat to iteratively adjust one or more commanded steering angles of the series or sequence of commanded steering angles determined by the vehicle prediction model 302 to minimize or otherwise optimize the cost associated with the predicted lateral position of the vehicle over the prediction horizon for the duration of time associated with the control cycle of the actuator control system 310, at which point the initial commanded steering angle value for the most recently determined series or sequence of commanded steering angles is output to the actuator control system 310 to control the vehicle actuators to steer the vehicle over the subsequent control cycle. For example, for an actuator control system 310 operating at a control frequency of 20 Hz to provide a control cycle time period of 50 milliseconds, the MPC system 300 may iteratively adjust the series or sequence of commanded steering angles multiple times during that period of 50 milliseconds before providing the initial steering angle command value from the resulting optimized sequence of commanded steering angles to the actuator control system 310 at the end of that 50 millisecond time period.

For example, in exemplary implementations, the MPC system 300 is initialized with the current vehicle state information and the reference trajectories for the vehicle and iteratively determines an optimal steering angle command at each respective discrete point of the points that define the prediction horizon that minimizes the value of a cost function at that particular point in time. In this regard, the optimal steering angle command at a particular point of time is limited to a value that is within a range of possible steering angle command values defined by one or more constraints associated with the MPC system 300, where the constraints may be adaptive or vary depending on the speed or velocity of the vehicle, the preceding steering angle command, and potentially other variables. At the initial point of the prediction horizon (e.g., k=1), the optimization model 308 iteratively adjusts or varies the steering angle command to be applied at the vehicle prediction model 302 that results in a predicted lateral position of the vehicle at the next subsequent point of the prediction horizon (e.g., ten milliseconds into the future at k=2) that minimizes a cost function after accounting for the predicted behavior of the steering angle control actuators defined by the actuator prediction model 304 and the corresponding delay predicted by the delay compensation model 306. After optimizing the initial point of the prediction horizon, steps forward to the second point of the prediction horizon (k=2), where the optimization model 308 iteratively adjusts or varies the steering angle command to be applied at the vehicle prediction model 302 at the second point of the prediction horizon (e.g., ten milliseconds into the future at k=2) that minimizes the value of the cost function at the next subsequent point of the prediction horizon (e.g., twenty milliseconds into the future at k=3) based on the predicted lateral position of the vehicle at that next subsequent point (k=3) by initializing the vehicle prediction model 302 with the predicted lateral position at the second point of the prediction horizon and previously-optimized steering angle command for the initial point of the prediction horizon. In this manner, the MPC system 300 steps through the discrete points of the prediction horizon to arrive at a predicted control trajectory vector (y) defined by the sequence of predicted lateral positions for the vehicle at the respective points of the prediction horizon and a corresponding optimal steering angle command vector (u) defined by the sequence of optimized steering angle command values at the respective points of the prediction horizon that minimizes the value of the cost function over the prediction horizon.

In exemplary implementations, the cost function utilized by the optimization model 308 to optimize the next steering angle command to be provided to the steering system actuators is represented by the equation $$V = \frac{1}{2}\sum_{k=1}^{p} \left\{ (y - y_{ref})^2 W_y + (u - u_{ref})^2 W_u + (u_k - u_{k-1})^2 W_{\Delta u} + \epsilon^2 W_\epsilon + (y - y_b)^2 W_b + \frac{1}{2}(u_{Driver} - u_{k-1})^2 W_D \right\},$$

where k represents the particular point of the prediction horizon, p represents the total number of points of the prediction horizon, y represents the control trajectory including the predicted lateral positions of the vehicle over the prediction horizon determined by the vehicle prediction model 302, $y_{ref}$ represents the reference lateral trajectory vector including the reference lateral positions for the vehicle targeted by the path planning algorithm(s) of the guidance system over the prediction horizon, u represents the steering angle command vector including future steering angle command values for the vehicle over the prediction horizon, $u_{ref}$ represents the reference steering angle command vector derived from or defined by the path planning algorithm(s) of the guidance system over the prediction horizon, $u_k$ represents a particular steering angle command of the sequence of steering angle commands being optimized by the MPC system 300, $y_b$ represents a reference lane boundary lateral position, $u_{Driver}$ represents a steering angle currently being manually commanded or applied by a driver manipulating the steering wheel or other control input, $\epsilon$ represents a slack variable that allows for some deviation from the constraints applied to the lateral position and steering angle, the details of which are not germane to this disclosure, and $W_y$, $W_u$, $W_{\Delta u}$, $W_b$, $W_D$ and $W_\epsilon$ represent weighting factors to be applied to the respective terms of the cost function. In this regard, the total cost associated with a particular sequence of steering angle commands and predicted lateral vehicle positions may be realized as a weighted sum of difference terms sought to be minimized or optimized by the optimization model 308 over the prediction horizon.

Figure 4:
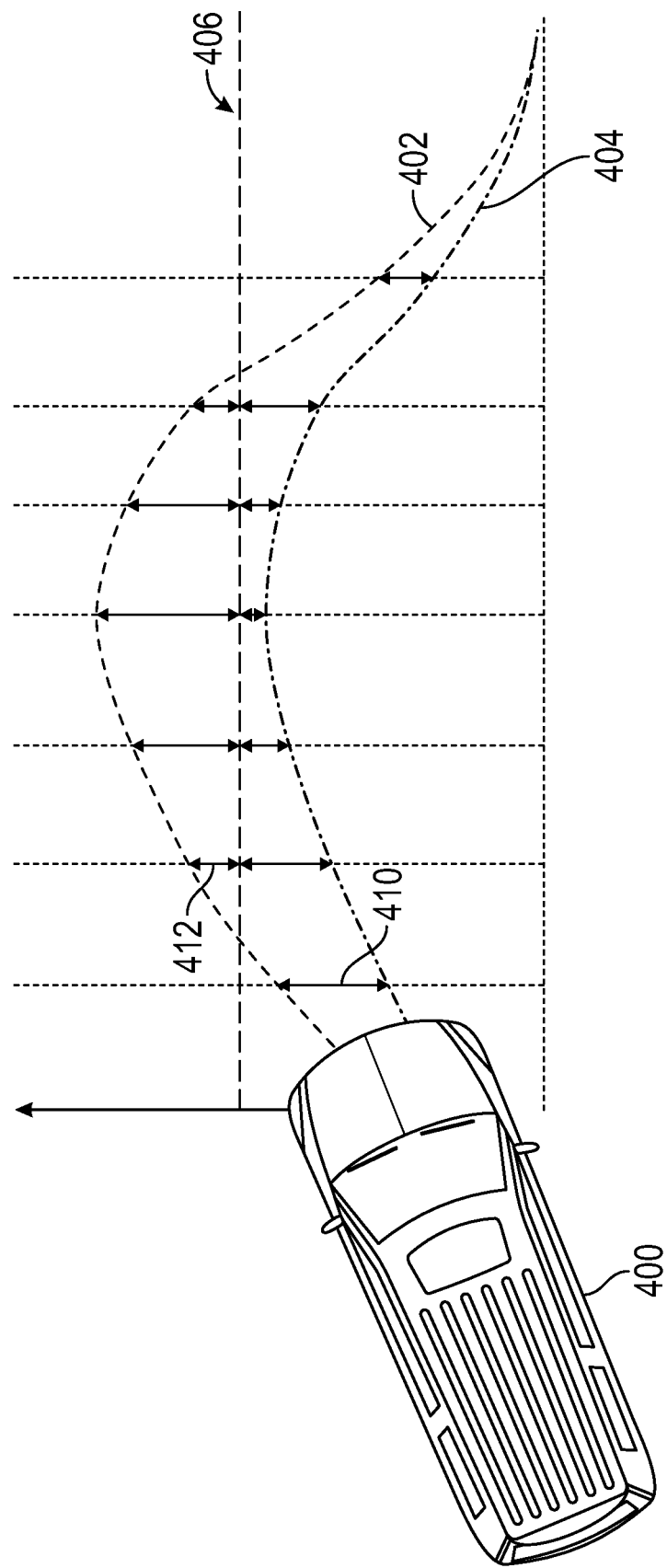
FIG. 4 is a schematic illustrating the relationship between a control trajectory for predicted lateral positions of a vehicle in relation to a reference lateral trajectory for the vehicle and a lane boundary referenced by a lane keeping assistance functionality of a vehicle guidance system.

Referring to FIG. 4 with continued reference to FIG. 3, the ($y-y_{ref}$) term minimizes deviation (e.g., difference 410) between the predicted lateral trajectory 402 for the vehicle and the input reference lateral trajectory 404 for returning the vehicle to a center of the current lane of travel that was determined by the path planning logic of the guidance system in accordance with the lane keeping assistance functionality supported by the guidance system. The ($u-u_{ref}$) term minimizes deviation between the predicted steering angle for the vehicle and the input reference steering angle determined by the path planning logic of the guidance system, the ($u_k-u_{k-1}$) minimizes the rate of change in the steering angle (e.g., the difference between successive steering angles) for passenger comfort and/or safety, the ($y-y_b$) term minimizes lane departure or excursion beyond the lateral lane boundary reference 406 (e.g., the difference 412 between the predicted lateral trajectory 402 and the lane boundary reference 406), and the ($u_{Driver}-u_{k-1}$) term minimizes the difference between the steering angle command determined by the MPC system 300 for the current point in time and the observed steering angle that the driver is attempting to achieve via the steering wheel or other input.

The ($u_{Driver}-u_{k-1}$) term minimizes the difference between the steering angle command determined by the MPC system 300 and the current steering angle being applied by the driver. Minimizing deviation between the automated control action and the driver input command when the driver is actively steering allows the lane keep assist functionality provided by the MPC system 300 to behave more intuitive and seamlessly with the driver's manual operation of the vehicle by reducing the disturbance or interference with the driver input command. As a result, the MPC system 300 facilitates collaborative steering by allowing the driver to deviate from the lane keeping control action while simultaneously allowing the MPC system 300 to minimize or otherwise optimize the driver's impact on the other control objectives (e.g., minimizing lane excursion, minimizing steering angle rate of change and/or the like). In one or more implementations, the driver input weighting factor $W_D$ is dynamically determined as a function of the driver's steering torque applied to the steering wheel such that the driver input weighting factor increases (or plateaus at some maximum value) at higher driver steering torque and decreases (or drops out to zero) at lower driver steering torques. For example, the driver input weighting factor may be governed by the equation $W_D=k_{db}*k_D$, where $k_D$ is a driver input command gain factor that is influenced by vehicle speed (or velocity) and decreases with respect to the elapsed time since the lane keep assistance intervention and $k_{db}$ is a driver input command dead band gain factor governed by the equation $k_{db}=\min(1, \partial_{ramp}*(u_{Driver}-u_{db}))$ when $u_{Driver}>u_{db}$ and equal to zero otherwise, where $u_{db}$ is the driver input command dead band, $\partial_{ramp}$ is the driver input command dead band ramp rate, and $u_{Driver}$ is the driver input steering angle command which may be determined by mapping the driver steering torque to corresponding steering angle according to the equation $u_{Driver}=G(\tau_{Driver})$, where $\tau_{Driver}$ is the driver steering torque.

In one or more implementations, the lane boundary weighting factor $W_b$ nonlinearly increases as the difference 412 between the predicted lateral trajectory 402 and the lane boundary reference 406 increases to increasingly penalize larger deviations from the lane boundary reference 406. In this manner, the cost function implemented by the optimization model 308 minimizes lane excursions while concurrently attempting to maximize following the reference trajectory back to the lane center by virtue of the ($y-y_{ref}$) term. Depending on the implementation, the position of the lane boundary reference 406 may be obtained, determined or otherwise derived using map data maintained in a data storage element associated with the vehicle (e.g., advanced driver assistance system (ADAS) map data, high-definition (HD) map data, or other map data maintained in data storage device 32) and/or computer vision techniques using image data or other sensor data obtained from one or more devices or components onboard the vehicle (e.g., one or more sensing devices 40a-40n associated with the sensor system 28 and/or the sensor fusion system 74).

Referring to FIGS. 3-4 with continued reference to FIGS. 1-2, by virtue of the cost function utilized by the MPC system 300, the MPC system 300 concurrently attempts to minimize the lane excursion while also maximizing the path following back to the center by implementing a boundary layer cost (e.g., the ($y-y_b$) term) which considers boundary layer transitions and adapts the boundary layer weight ($W_b$). Additionally, by predicting future lane excursions over the prediction horizon, the MPC system 300 may preemptively engage the lane keep assist functionality by proactively providing steering commands that minimize the future lane excursion and steer the vehicle back to the lane center prior to any lane departure, thereby minimizing minor lane excursions that may occur using conventional feed-forward or feedback controls that are based on time to lane crossing rather than distance. Thus, in contrast to approaches that rely on a time to lane crossing threshold that do not consider the aggressiveness of the resulting control action, the MPC system 300 behaves more intuitively by preemptively and proactively attempting to avoid aggressive control actions by penalizing steering angle rate of change in the cost function and providing explicit constraints on the steering angle to maintain any steering angle command within thresholds defined for passenger comfort and/or safety. At the same time, the MPC system 300 accounts for the current driver inputs to minimize the deviation between any preemptive automated control action and the driver input while the driver is actively steering, thereby minimizing potential disruption or interference with the driving experience and promoting collaborative steering by allowing driver to deviate from lane keeping control action while at the same time attempting to minimize the impact of the driver action on other control objectives.

In one or more implementations, the MPC system 300 continually determines and updates the control trajectory while the lane keep assist functionality is disengaged and analyzes the resulting control trajectory and steering angle command vectors over the prediction horizon to automatically determine when to engage or otherwise activate the lane keep assist functionality based on the predicted lane keep assist control trajectory and steering angle commands. In this regard, rather than engaging or activating the lane keep assistance based purely on the estimated amount of time remaining until crossing a lane boundary, the ADS 70 and/or the vehicle control system 80 accounts for the vehicle dynamics and analyzes the potential future steering angles that may be required to regulate the lateral position of the vehicle to preemptively or proactively engage the lane keep assist functionality earlier in a manner that accounts for passenger comfort, stability, and the aggressiveness of the control action that may otherwise be required to satisfy lane boundary constraints if engagement is delayed. For example, even though the estimated amount of time remaining until crossing a lane boundary (or time to lane crossing (TTLC)) may be greater than an activation threshold), the ADS 70 and/or the vehicle control system 80 may automatically and autonomously activate the lane keep assist functionality and implement the corresponding steering angle commands and lateral trajectories determined by the MPC system 300 when the difference between the maximum future steering angle command value within the optimized steering angle command vector (u) and the current steering angle is greater than an engagement threshold and/or the maximum rate of change between successive steering angle commands of the optimized steering angle command vector (u) is greater than an engagement threshold. Thus, rather than delaying lane keep assist engagement until a point in time likely to require a steering angle or change in steering angles that could interfere with passenger comfort or vehicle stability, the ADS 70 and/or the vehicle control system 80 may leverage the MPC system 300 to preemptively regulate the lateral position of the vehicle even though the crossing of a lane boundary may not be imminent based on the TTLC value or the TTLC engagement threshold.

For sake of brevity, conventional techniques related to lane keep assistance, driver assistance features, autonomous vehicles, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an implementation of the subject matter.

As used herein, the word "exemplary" means "serving as an example, instance, or illustration." Thus, any implementation described herein as "exemplary" is not necessarily to be construed as preferred or advantageous over other implementations. All of the implementations described herein are exemplary implementations provided to enable persons skilled in the art to make or use the invention and not to limit the scope of the invention which is defined by the claims.

Those of skill in the art will appreciate that the various illustrative logical blocks, modules, circuits, and algorithm steps described in connection with the implementations disclosed herein may be implemented as electronic hardware, computer software, or combinations of both. Some of the implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is logically coherent.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an implementation of the depicted subject matter. In addition, certain terminology may also be used herein for the purpose of reference only, and thus are not intended to be limiting.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing the exemplary aspect or exemplary aspects. It should be understood that various changes can be made in the function and arrangement of elements without departing from the scope of the disclosure as set forth in the appended claims and the legal equivalents thereof.

What is claimed is:

1. A method of assisting operation of a vehicle, the method comprising:
obtaining, by a controller associated with the vehicle, a reference lateral trajectory for the vehicle;
obtaining, by the controller, a current steering angle associated with the vehicle;

determining, by the controller, a control trajectory for the vehicle over a prediction horizon that satisfies one or more steering angle constraints for operating the vehicle based at least in part on the current steering angle, a first difference between the control trajectory and the reference lateral trajectory and a second difference between the control trajectory and a lane boundary;

determining, by the controller, a steering angle command for the vehicle based at least in part on the control trajectory; and autonomously operating, by the controller, one or more actuators onboard the vehicle in accordance with the steering angle command prior to the vehicle crossing the lane boundary.

2. The method of claim 1, wherein determining the control trajectory comprises:

determining a sequence of future steering angle commands for the vehicle based at least in part on the current steering angle and the one or more steering angle constraints; and determining a sequence of predicted lateral positions for the vehicle over the prediction horizon based at least in part on the sequence of future steering angle commands, wherein the control trajectory comprises the sequence of predicted lateral positions.

3. The method of claim 2, wherein determining the sequence of future steering angle commands comprises iteratively adjusting one or more of the future steering angle commands to minimize the first difference between the control trajectory and the reference lateral trajectory.

4. The method of claim 2, wherein determining the sequence of future steering angle commands comprises iteratively adjusting one or more of the future steering angle commands to minimize the second difference between the control trajectory and the lane boundary.

5. The method of claim 2, wherein determining the sequence of future steering angle commands comprises iteratively adjusting one or more of the future steering angle commands to minimize a weighted sum of the first difference between the control trajectory and the reference lateral trajectory and the second difference between the control trajectory and the lane boundary.

6. The method of claim 2, wherein determining the sequence of future steering angle commands comprises iteratively adjusting one or more of the future steering angle commands to minimize a third difference between successive future steering angle commands of the sequence of future steering angle commands.

7. The method of claim 2, wherein determining the sequence of future steering angle commands comprises iteratively adjusting one or more of the future steering angle commands to minimize a third difference between an initial future steering angle command of the sequence of future steering angle commands and a driver steering angle commanded by a driver of the vehicle.

8. The method of claim 1, wherein obtaining the reference lateral trajectory comprises receiving the reference lateral trajectory for returning the vehicle to a center of a lane in accordance with lane keeping assistance functionality of a guidance system associated with the vehicle.

9. The method of claim 1, wherein autonomously operating the one or more actuators comprises autonomously operating the one or more actuators onboard the vehicle in accordance with the steering angle command when a future steering angle command of a sequence of future steering angle commands associated with the control trajectory satisfies an engagement threshold.

10. The method of claim 9, wherein autonomously operating the one or more actuators comprises autonomously operating the one or more actuators onboard the vehicle in accordance with the steering angle command when a difference between the future steering angle command and the current steering angle for the vehicle is greater than a first threshold or when a rate of change associated with the future steering angle command is greater than a second threshold.

11. A non-transitory computer-readable medium comprising executable instructions that, when executed by a processor, cause the processor to provide a model predictive control system configured to:

obtain a reference lateral trajectory for a vehicle;

obtain a current steering angle associated with the vehicle;

determine a control trajectory for the vehicle over a prediction horizon that satisfies one or more steering angle constraints for operating the vehicle based at least in part on the current steering angle, a first difference between the control trajectory and the reference lateral trajectory and a second difference between the control trajectory and a lane boundary;

determine a steering angle command for the vehicle based at least in part on the control trajectory; and autonomously operate one or more actuators onboard the vehicle in accordance with the steering angle command prior to the vehicle crossing the lane boundary.

12. The non-transitory computer-readable medium of claim 11, wherein the model predictive control system is configurable to:

determine a sequence of future steering angle commands for the vehicle based at least in part on the current steering angle and the one or more steering angle constraints; and determine a sequence of predicted lateral positions for the vehicle over the prediction horizon based at least in part on the sequence of future steering angle commands, wherein the control trajectory comprises the sequence of predicted lateral positions.

13. The non-transitory computer-readable medium of claim 12, wherein the model predictive control system is configurable to iteratively adjust one or more of the future steering angle commands to minimize the first difference between the control trajectory and the reference lateral trajectory.

14. The non-transitory computer-readable medium of claim 12, wherein the model predictive control system is configurable to iteratively adjust one or more of the future steering angle commands to minimize the second difference between the control trajectory and the lane boundary.

15. The non-transitory computer-readable medium of claim 12, wherein the model predictive control system is configurable to iteratively adjust one or more of the future steering angle commands to minimize a weighted sum of the first difference between the control trajectory and the reference lateral trajectory and the second difference between the control trajectory and the lane boundary.

16. The non-transitory computer-readable medium of claim 12, wherein the model predictive control system is configurable to iteratively adjust one or more of the future steering angle commands to minimize a third difference between successive future steering angle commands of the sequence of future steering angle commands.

17. The non-transitory computer-readable medium of claim 12, wherein the model predictive control system is configurable to iteratively adjust one or more of the future steering angle commands to minimize a third difference between an initial future steering angle command of the sequence of future steering angle commands and a driver steering angle commanded by a driver of the vehicle.

18. The non-transitory computer-readable medium of claim 11, wherein the reference lateral trajectory comprises the reference lateral trajectory for returning the vehicle to a center of a lane in accordance with lane keeping assistance functionality of a guidance system associated with the vehicle.

19. A vehicle comprising:
a steering system;
one or more actuators associated with the steering system; and
a controller coupled to the one or more actuators that, by a processor, is configured to:
obtain a reference lateral trajectory for the vehicle;
obtain a current steering angle associated with the steering system of the vehicle;
identify a lane boundary for a current lane of travel for the vehicle;
determine a control trajectory for the vehicle over a prediction horizon that satisfies one or more steering angle constraints for operating the steering system based at least in part on the current steering angle, a first difference between the control trajectory and the reference lateral trajectory and a second difference between the control trajectory and the lane boundary;
determine a steering angle command for the one or more actuators based at least in part on the control trajectory; and
autonomously operate the one or more actuators onboard the vehicle in accordance with the steering angle command to control a subsequent steering angle associated with the steering system prior to the vehicle crossing the lane boundary.

20. The vehicle of claim 19, wherein the controller is configurable to provide a model predictive control system to:
determine a sequence of future steering angle commands for the vehicle based at least in part on the current steering angle and the one or more steering angle constraints; and
determine a sequence of predicted lateral positions for the vehicle over the prediction horizon based at least in part on the sequence of future steering angle commands, wherein the control trajectory comprises the sequence of predicted lateral positions and the model predictive control system is configurable to iteratively adjust one or more of the future steering angle commands to minimize at least one of:
the first difference between the control trajectory and the reference lateral trajectory; and
the second difference between the control trajectory and the lane boundary.

* * * * *